(12) United States Patent
Gupta et al.

(10) Patent No.: US 9,494,969 B2
(45) Date of Patent: Nov. 15, 2016

(54) RESET CIRCUITRY FOR INTEGRATED CIRCUIT

(71) Applicants: Aniruddha Gupta, Ghaziabad (IN); Akshay K. Pathak, Noida (IN); Garima Sharda, Ghaziabad (IN); Nidhi Sinha, New Delhi (IN)

(72) Inventors: Aniruddha Gupta, Ghaziabad (IN); Akshay K. Pathak, Noida (IN); Garima Sharda, Ghaziabad (IN); Nidhi Sinha, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/457,133

(22) Filed: Aug. 12, 2014

(65) Prior Publication Data

US 2016/0048155 A1  Feb. 18, 2016

(51) Int. Cl.
*H03L 7/00* (2006.01)
*G06F 1/12* (2006.01)

(52) U.S. Cl.
CPC ...................... *G06F 1/12* (2013.01)

(58) Field of Classification Search
CPC ........................................................ G06F 1/12
See application file for complete search history.

(56) References Cited

U.S. PATENT DOCUMENTS 5,537,655 A   7/1996  Truong
7,594,211 B1  9/2009  Tian et al.
2012/0062282 A1*  3/2012  Hu ............................ G06F 1/10
                                                              327/142
2012/0124407 A1  5/2012  Shimizu
2013/0227257 A1  8/2013  Singh et al.

OTHER PUBLICATIONS

Neelam R. Prakash and Akash, "Clock Gating for Dynamic Power Reduction in Synchronous Circuits", International Journal of Engineering Trends and Technology, vol. 4, Issue 5, May 2013, pp. 1760-1763.
Sanymi Gupta, Aniruddh Gupta, Ankush Sethi, "Efficient analysis of CDC violations in a million gate SoC—part 2", EDN Network, http://www.edn.com/design/integrated-circuit-design/4427844/Efficient-analysis-of-CDC-violations-in-a-million-gate-SoC-part-2, Feb. 3, 2014.
"Memory Content Protection on Asynchronous Reset or Voltage Trip Below Minimum Data Hold Retention Voltage", IPCOM000220217D, http://priorartdatabase.com/pubView/IPCOM000220217D, Jul. 25, 2012.

* cited by examiner

*Primary Examiner* — Daniel Puentes
(74) *Attorney, Agent, or Firm* — Charles E. Bergere

(57) ABSTRACT

An on-board reset circuit for a system-on-chip (SOC) addresses the problem of meta-stability in flip-flops on asynchronous reset that arises when different power domains or reset domains receive resets from different sources. To ameliorate the problem, a reset signal is asserted and de-asserted while the clocks are gated. The clocks are re-instated for a minimum period of time following assertion (or de-assertion) so that logic having synchronous reset can also receive the reset.

11 Claims, 4 Drawing Sheets

RESET CIRCUITRY FOR INTEGRATED CIRCUIT

BACKGROUND OF THE INVENTION

The present invention relates generally to integrated circuits and, more particularly, to reset circuitry for integrated circuits.

With the increased complexity of digital design, the reset architecture has also become very complex. In a typical SOC, a "global chip reset," which resets most of the system, is a combination of multiple reset sources which can be generated either by software or hardware. Power On Reset (POR), Low Voltage Detect reset, Watchdog Timeout reset, Debug reset, Software reset, and Loss of Clock reset are some examples which cause the assertion of a global reset. However, there can be some parts of the system which are not in the reset state even with assertion of the global reset. Some examples are: time keeping functionality, calendaring features, and reset status registers, which capture the reset event causing the global reset. So there is the possibility that a part of the system which asynchronously goes into reset state can corrupt another other part not in a reset state.

Reset procedures may be synchronous (with a system clock) or asynchronous. Synchronous resets are based on the premise that the reset signal will affect or reset the state of a flip-flop only on the active edge of its clock input. It is not uncommon to gate the system clock in order to save power and such cases, asynchronous reset is preferred in order to avoid the situation of the clock being disabled at the same time as an assertion of a reset. However, asynchronous reset is not without its drawbacks. Consider first and second flip-flops where the output ("Q") of the first flip-flop provides the input ("D") to the second flip-flop and each flip-flop has a different reset source. The assertion of a reset to the first flip-flop while no reset is being asserted to the second flip-flop can cause meta-stability in the second flip-flop if the input to the second flip-flop changes within its set-up or hold window. Further, if the output of the second flip-flop is used in some other part of the system, then this meta-stability can cause functional failures such as memory data corruption or software programmable configuration register corruption in some circumstances. In a sequential design, if the reset of a source register is different from the reset of destination register (as in the example of the two flip-flops mentioned above), even though the data path may be in same clock domain, an asynchronous crossing path will exist and may cause meta-stability at a destination register. This effect is termed herein as a "Reset Domain Crossing" (RDC).

Hence it would be advantageous to provide a means for resolving these reset domain crossing issues.

Apart from the issues related to asynchronous reset assertion mentioned above as reset domain crossings, there are issues related to asynchronous reset de-assertion as well. If the asynchronous reset is de-asserted within the setup or hold window of the clock of flip-flop then there could be meta-stability at the flip-flop's output. Another issue is reset propagation delay to different device locations, especially from the core of an SOC to the periphery of the integrated circuit. Consider two sequential elements with different propagation delays from the reset signal source. After the assertion of the reset signal, these sequential elements both get reset. Then the reset signal de-asserts just before a clock edge. The sequential element with a short propagation delay comes out of the reset state following the clock edge. The other element with a long propagation delay, however, may miss the clock edge, so it remains in reset state, damaging the circuit performance. This problem is more pronounced when sequential elements are distributed in remote areas of the circuit, such as in the peripheral areas for I/O (Input/Output) modules.

Hence it would also be advantageous to provide a means for resolving the problems related to asynchronous reset de-assertion.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
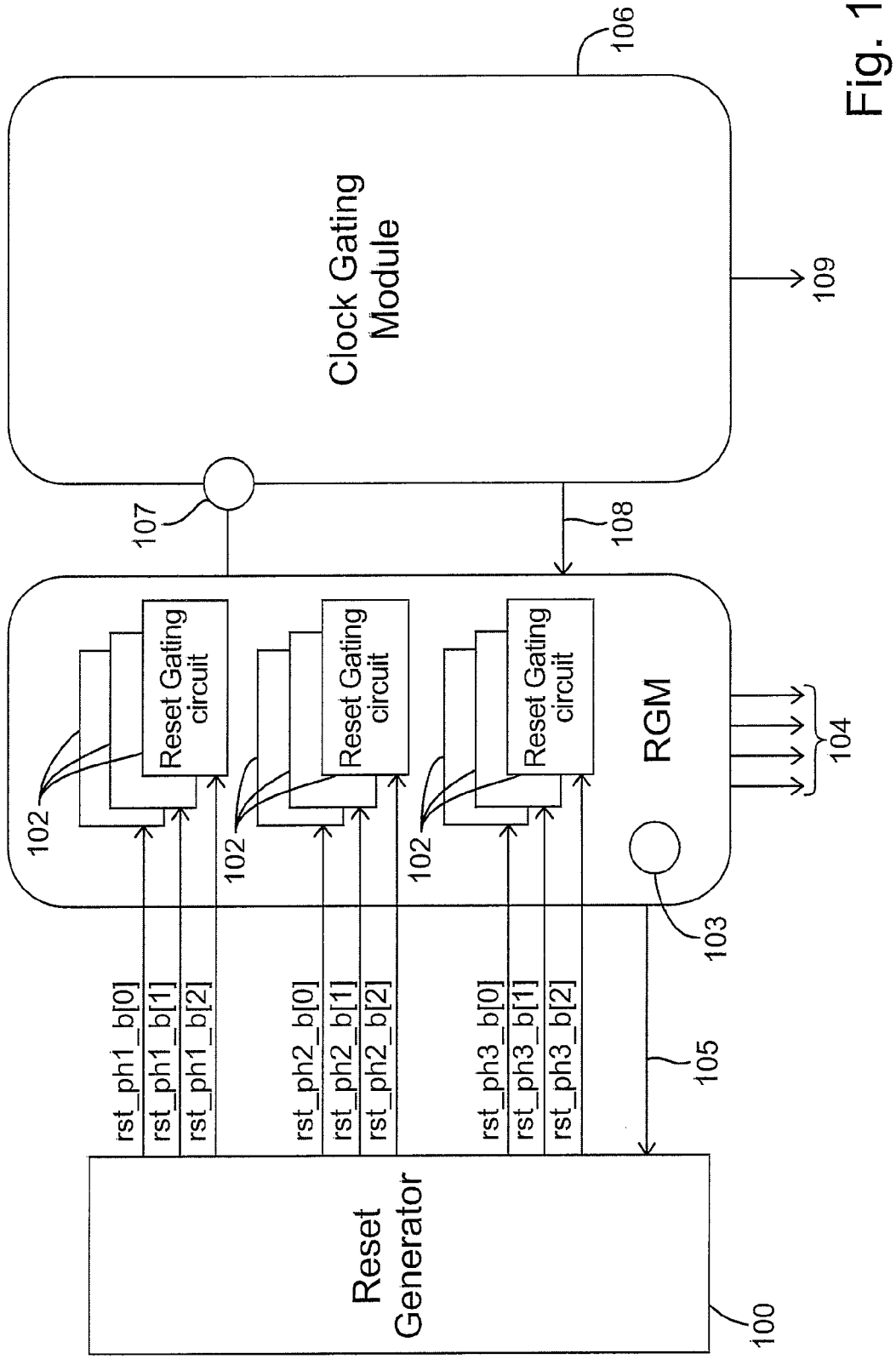
FIG. 1 is a simplified, schematic block diagram of apparatus for resetting an integrated circuit device and incorporating reset circuitry in accordance with an embodiment of the invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides reset circuitry for an integrated circuit device, wherein the integrated circuit device is provided with a clock and a reset generator. The reset circuitry comprises: a reset gating module for receiving a generated reset signal from the reset generator and for generating a clock gating instruction in response, a clock gating module, operably coupled to the reset gating module, for receiving the clock gating instruction and in response, for gating the clock and generating a confirmation signal when the clock has been gated. The reset gating module is arranged, on receipt of the confirmation signal, to release the reset signal for propagation in the integrated circuit. The reset gating module is further arranged, on expiry of a first pre-set duration of time, to instruct the clock gating module to re-instate the clock for at least a second pre-set duration of time.

In another embodiment, the present invention provides a method of resetting an integrated circuit device, wherein the integrated circuit device is provided with a clock and a reset generator. The method comprises: detecting a generated reset signal and generating a clock gating instruction in response; gating the clock and generating a confirmation signal when the clock has been gated; releasing the reset signal for propagation in the integrated circuit; and on expiry of a first pre-set time period, re-instating the clock for at least a second pre-set period of time.

In one embodiment, the assertion and de-assertion of the generated reset signal are both detected by the reset circuitry and clock gating occurs on both assertion and de-assertion of the propagated reset signal.

During the first preset time period, a reset can be asserted or de-asserted. In one example, the first pre-set time period is set to be no less than the worst reset propagation delay of the integrated circuit.

The second preset time period permits the clock to be enabled for a minimum period of time before any further clock gating instruction can be issued on detection of a further, generated reset signal. The second preset time period ensures that a reset can propagate to logic in the IC that has synchronous resets.

Advantageously, by virtue of clock gating while a reset is being asserted, reset domain crossings can be avoided. Further, a reset may be propagated in no clock, low power operating modes.

Also, advantageously, by virtue of clock gating while a reset is being de-asserted, any meta-stability on reset de-assertion is avoided and without the need for any additional reset synchronizer. Also advantageously, any reset de-assertion issue due to variation in reset propagation delay is avoided.

In some examples, the IC is partitioned into a plurality of domains. These domains may be power domains or reset domains, for example. The clocks of a particular domain or of the entire integrated circuit may be gated when a reset is being asserted or de-asserted in a domain or the entire integrated circuit. Hence, the invention supports partition-based (or domain-based) resets. The reset gating module may comprise a state machine which detects generation of a reset signal by the reset generation module and performs a handshake with each domain to ensure that clock gating has occurred and that the reset gating module and the reset generation module are acting in synchronism.

In another embodiment, the invention provides an optional back-up clock and clock selector circuitry as a safety feature in the event of failure of the integrated circuit's system clock source. (IRC, for example). If there is no reliable clock source at all, the reset circuitry may switch itself out of operation.

In another embodiment, an auto-recovery system watch-dog is provided to ensure that any fault arising in the reset circuitry does not prevent a reset sequence from being completed.

Referring now to FIG. 1, a circuit for resetting an integrated circuit (IC) and including reset circuitry is shown. The circuit may be incorporated in an employed within a device such as an SOC. The SOC is provided with a system clock and may be partitioned into domains. Typically, each domain receives a clock that is derived from the system clock. The SOC may be required to execute a reset sequence having multiple phases. A reset generator 100 is operably coupled to a reset gating module, (RGM) 101. The reset generator 100 may be of conventional design and is capable of generating a plurality of reset signals which are applied to inputs of the reset gating module 101.

The reset gating module 101 includes a plurality of reset gating circuits 102 and an auto recovery watchdog circuit 103. The reset gating module 101 has output lines 104, which supply reset signals to various domains of the SOC. A further output line 105 of the reset gating module 101 is fed to an input of the reset generator 100 and a signal on this line 105 ensures synchronism between the reset gating module 101 and the reset generator 100. The reset gating module 101 is also operably coupled to a clock gating module (CGM) 106.

The clock gating module 106 is capable of gating (disabling) the clocks supplied to each domain of the SOC in response to a signal from the reset gating module 101. The clock gating module 106 is also capable of re-instating (enabling) the clocks on instruction from the reset gating module and after a preset time period has expired. The clock gating module 106 is also capable of ensuring that another clock gating sequence does not trigger before a minimum preset duration of time has expired. This ensures that a reset propagates to logic with synchronous resets. The clock gating module 106 includes a logic circuit 107 for ensuring symmetric clock gating in a manner to be described below. An output of the clock gating module 106 on line 108 is fed to the reset gating module 101 for confirming clock gating status to the reset gating module 101. The clock gating module 106 is operably coupled to the domains of the SOC and can communicate with them on line 109. In particular, clock disable/enable signals are output from the clock gating module on line 109. In some embodiments, each domain is provided with a clock gating module 106, which communicates with a respective reset gating circuit 102.

In the example of FIG. 1, the reset sequence of the SOC has three phases; ph1, ph2, ph3. Typical examples of reset phases are as follows: "Powerup." Exit from this phase indicates that the SOC Power supply is up. No digital logic works before this; "Phase0." Exit from this phase indicates that digital logic can be functional now. Basic IRC clock is stable & running; "Phase1—Flash Powerup phase." This indicates power-up for flash. No logic dependent on flash for its operation works until now; "Phase2— Flash initialization Phase." This phase indicates that Flash is powered up and internal flash initialization is ongoing. No logic dependent on flash for its operation works until now; "Phase3— Flash loading phase." This phase indicates that the flash is available and all the logic which requires flash for its initialization can load its content. Exit from this Phase indicates the exit from the reset sequence to the external world. This is typically communicated via the External RESET pin. On completion of such a sequence, the software starts running and the constituent modules of the SOC can be configured for its operation via software. The reset generator 100 issues different resets for each phase, and depending on the number of domains the SOC has been partitioned into, will also generate resets for each domain.

In the example of FIG. 1, the SOC comprises three power domains (0, 1, 2). So for the first reset phase, when the "0" domain is powered, the reset generator's output rst_ph1_b [0] will remain active. The output rst_ph1_b[1] will remain active when domain "1" is powered and rst_ph1_b[2] will remain active when domain "2" is powered. Each of these three inputs is fed to a respective reset gating circuit 102 in the reset gating module 101. Similarly for the second reset phase, when the "0" domain is powered, the reset generator's output rst_ph2_b[0] will remain active. The output rst_ph2_b[1] will remain active when domain "1" is powered and rst_ph2_b[2] will remain active will remain active when domain "2" is powered. For the third reset phase, when the "0" domain is powered, the reset generator's output rst_ph3_b[0] will remain active. The output rst_ph3_b[1] will remain active when domain "1" is powered and rst_ph3_b[2] will remain active will remain active when domain "2" is powered. All nine reset outputs are fed to respective reset gating circuits 102 in the reset gating module 101.

The functionality of each reset gating circuit can be realized by a combination of logic circuits/gates. Such functionality includes detection of a reset signal (rst_ph1_b [0], etc.). The reset signal is then latched for release at a later and appropriate time on one of the output lines 104 of the reset generation module 101. When a reset assertion or de-assertion has been detected, a first instruction signal is generated by the reset gating circuit 102 which instructs the clock gating module 106 to gate the clock(s) supplying to the domain to be reset. The reset gating circuit 102 waits for receipt from the clock gating module 106, of a confirmation signal which confirms that clock gating has been successfully initiated. On receipt of the confirmation signal, the latched reset signal is then released. When the reset signal is released, a counter (or timer) function in the reset gating circuit 102 is started. This counter is set to count a first pre-set time period equal to the maximum reset propagation delay in the SOC. When this first time period expires, the reset gating circuit 102 generates a second instruction to the clock gating module 106 to re-instate the clocks for a second period of time. Re-instating (enabling) the clocks after reset release ensures that any synchronous reset flip-flops in the SOC also receive this reset. The counter is also set to count the second pre-set time period to ensure that the clocks remain enabled for a minimum duration of time before which any other clock gating instruction could be serviced by the clock gating module 106.

The reset gating module 101 also includes a functionality which ensures that it works in synchronism with the reset generator 100. As the action of the reset gating module 101 introduces a delay into the reset process initiated by the reset generator 100, a situation can arise where the de-assertion of various reset phases occurs much earlier (at the reset generator 100) than actual de-assertion by the reset gating module 101. In such cases, the reset generator 100 assumes that the reset sequence has ended when in fact the SOC is still in reset. So subsequently, the reset generator's 100 may start another reset sequence while the reset gating module 101 is still servicing a previous reset request. This could lead to functional failures in the SOC and to related issues such as a reset being de-asserted in some parts of the SOC but not in others. In order to prevent this situation from arising, the reset gating module 101 generates a control signal on line 105 which it applies to the reset generator 100 that tells the reset generator 100 when it can exit a particular reset phase. This control signal is based on the output of a counter which provides an indication that a minimum time, during which a reset procedure has to remain in a particular phase, has expired. Counts may be done on both reset assertion and reset de-assertion and compared with a fixed value. This counter is the same as mentioned above for ensuring that clocks remain enabled for the second preset time period. This second preset time period is set on the basis of the minimum duration for which a reset procedure has to remain in a particular phase.

The clock gating module 106 includes a logic circuit 107 that ensures symmetric gating of the various clocks supplying the various domains of the SOC. If the clocks of different domains were to be gated at different moments in time, then this could cause other parts of the SOC, that function on the basis of a ratio between two synchronous clocks for example, to become out of phase with other synchronous clocks used in the SOC. To avoid this situation, the logic circuit 107 is arranged to detect a time "window" when all the synchronous clocks of the SOC are aligned (for example the moment when all clocks have a positive-going edge). The window can be detected based on the outputs of the counters used in the SOC domains for generating divided clocks. In one example, the outputs of the counters are ANDed together. At some point all these counters will expire and when this occurs, the output of the AND gate is used by the clock gating module 106 to enable a clock gating instruction which has been received from the reset gating module 101 so that it can be propagated to the clock circuits in the relevant domains in the SOC. In this way, when any clock gating instruction is received from the reset gating module 101, the clock gating module 106 gates all synchronous clocks when the window has been detected. Once the window has been detected and the clock gating signal has been forwarded to the relevant domains, the clock gating module 106 sends a confirmation signal to the reset gating module 101.

Figure 2:
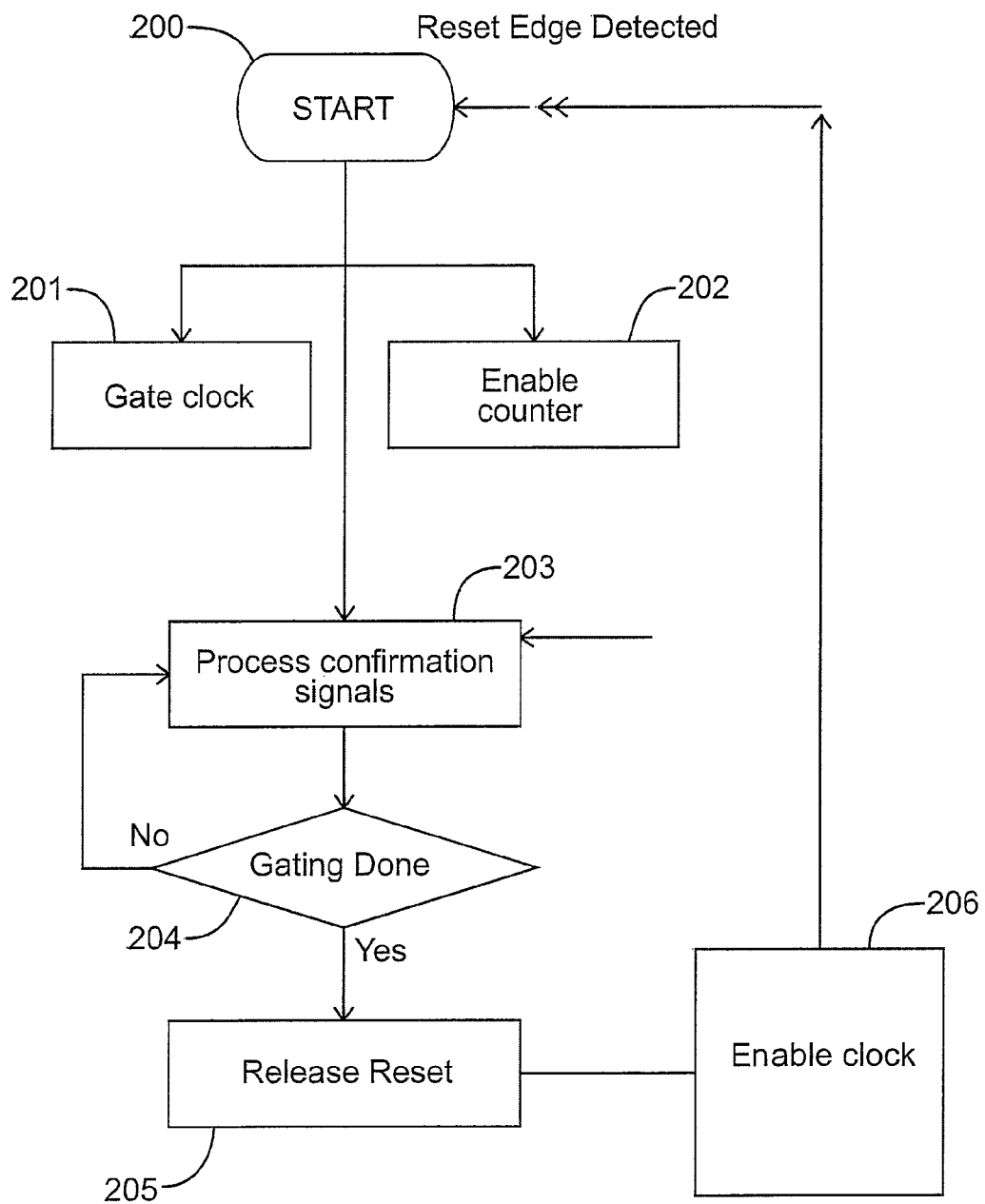
FIG. 2 is a simplified flowchart of a method of resetting an integrated circuit device in accordance with an embodiment of the invention.

With reference now to FIG. 2, a method for resetting a system-on-chip starts at 200 with detection of a reset assertion or de-assertion signal received from a reset generator. At 201 and 202 respectively, a clock gating instruction is generated and a counter is enabled. At 203, one or more clock gating confirmation signals are processed and at 204 it is determined if clock gating has been done. If clock gating has been done, then at 205, the reset signal is released and the counter is set. When the counter reaches a first preset value, the clocks are enabled at 206. When the counter reaches a second preset value, indicating that a minimum duration for which the clocks need to remain enabled has expired, the method reverts to step 200 for detection of a further assertion or de-assertion of a generated reset signal.

Figure 3:
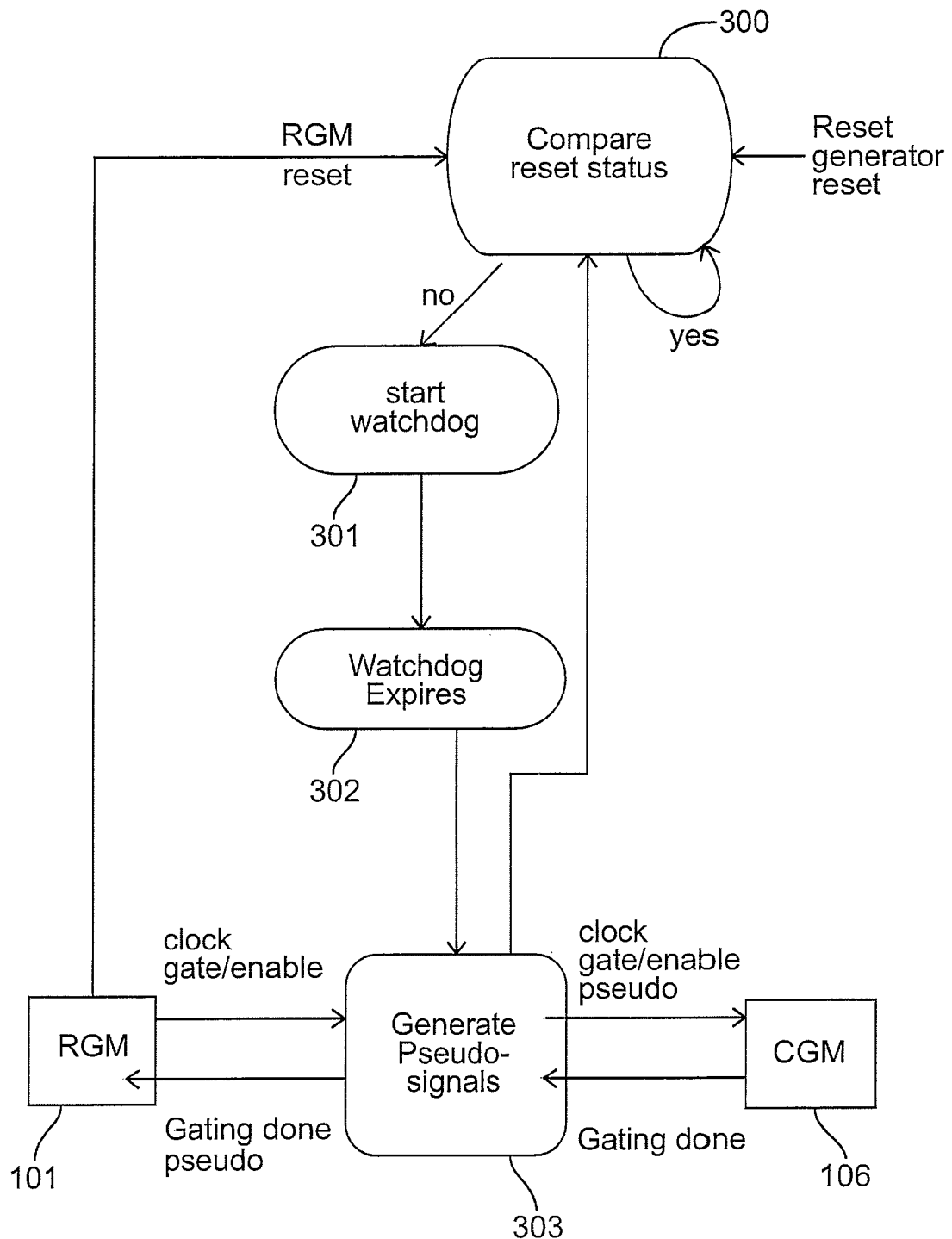
FIG. 3 is a simplified flowchart of a method of operating a watchdog circuit in the apparatus of FIG. 1.

Should there be any failure or malfunction of a reset gating circuit 102 or clock generation module 106, the auto recovery watchdog circuit 103 ensures that any reset sequence that has been initiated by the reset generator 100 will still be completed. An example of operation of the watchdog circuit 103 will now be described with reference to FIG. 3. The watchdog circuit 103 essentially compares (at step 300) the current status of the reset generator 100 and the reset gating module 101. In one embodiment, the watchdog circuit triggers (that is, starts a timer) whenever it detects that a reset generator's reset has been de-asserted while the reset of the reset gating module has not yet been de-asserted. Similarly the watchdog circuit 103 also triggers (that is, starts a timer) when it detects that a reset of the reset generator has been asserted while the reset of the reset gating module has not yet been asserted. In either case, the watchdog is started at step 301. If the timer should expire (at step 302) before the watchdog circuit detects equivalence between the reset generator's and the reset gating module's status, then the process moves to step 303. At 303, the watchdog circuit determines if a clock gating/enable instruction signal has been generated by the reset gating circuit 102 and if a confirmation signal has been received from the clock gating module 106 and if these signals are not detected, then the watchdog circuit generates a "pseudo" clock gating instruction and/or confirmation signal for use by the clock gating module and reset gating module so that the reset process can continue and complete. The method then reverts to the comparison step at 300.

Figure 4:
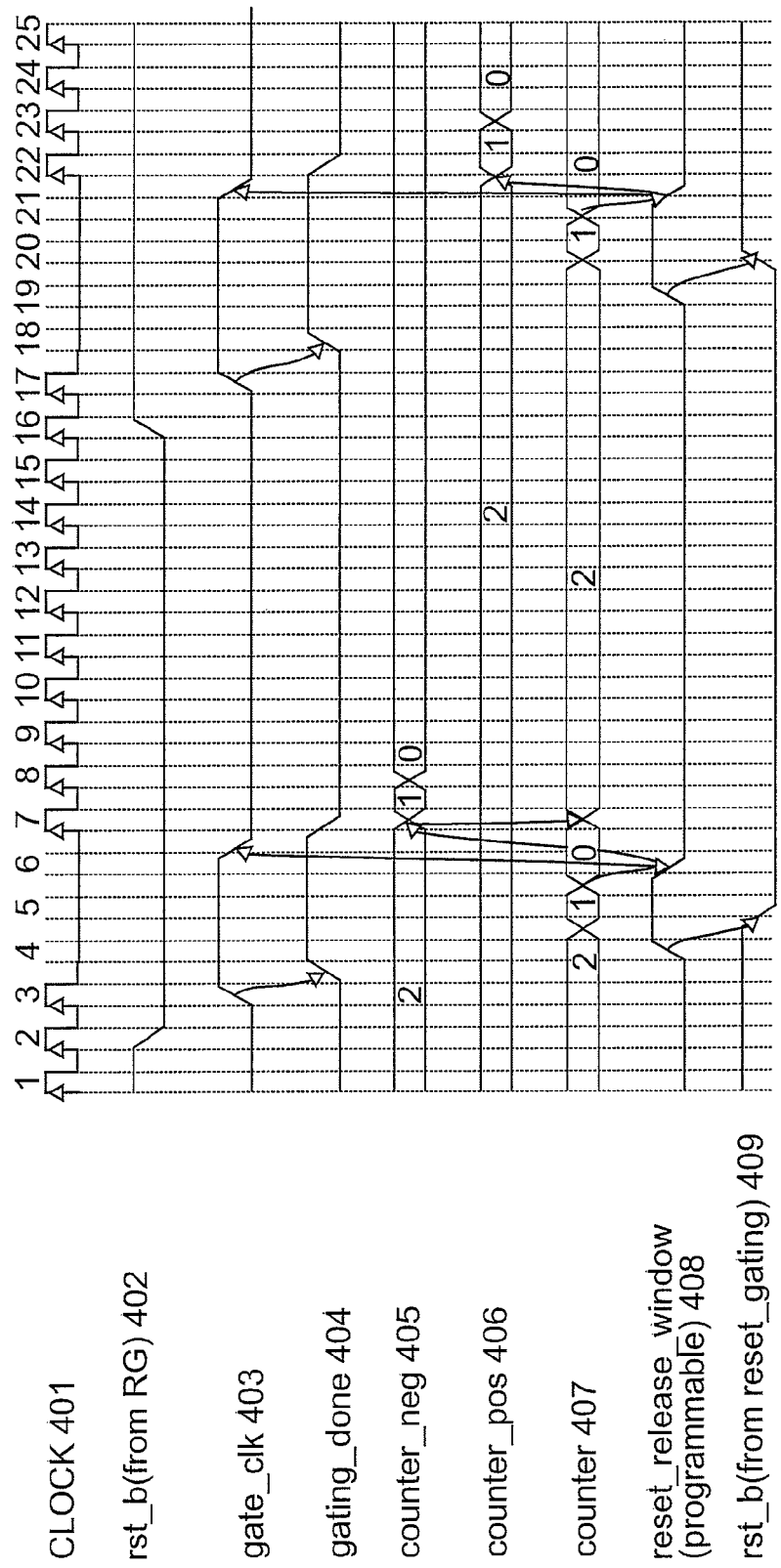
FIG. 4 is a timing diagram illustrating reset assertion and de-assertion in accordance with an embodiment of the invention.

Reference will now be made to FIG. 4, which is a timing diagram illustrating an example of operation of the reset circuitry of FIG. 1. Trace 401 represents a clock signal which supplies at least one reset domain or power domain of the SOC and which is to be gated during assertion and de-assertion of a reset. Trace 402 represents a reset signal which is generated by the reset generator 100. In this example, a reset assertion occurs on a high to low transition and a reset de-assertion occurs on a low to high transition. Trace 403 represents clock gating instructions that are generated by the reset gating module 101 on detection of the negative-going and positive-going edges of the reset signal of trace 402. Trace 404 represents clock gating confirmation signals generated by the clock gating module 106 and received by the reset gating module 101. In cases where there are multiple synchronous clock domains, a (symmetric) clock gating module 107 can ensure that clock gating/enabling (Trace 404) happens on the negative-going edge of the fastest clock such that the next positive-going edge of all the synchronous clocks will be aligned. Hence Trace 404 can get further delayed as compared to what is shown in FIG. 4. Traces 405, 406 and 407 represent counter values of the counter function of the reset gating module 101. Trace 405 representing the counter value indicates the minimum duration for which a reset should remain asserted. Trace 406 representing the counter value indicates the minimum duration for which a reset should remain de-asserted. Trace 407 representing the counter value indicates the duration which corresponds to the worst case propagation delay in a reset tree. Trace 408 represents a programmable reset release window. This reset release window corresponds to the worst case propagation delay in a reset tree i.e., trace 407. Increasing this reset release window will ensure that the clock remains gated for a longer duration. In the timing diagram only a single clock is shown. In cases where there are multiple synchronous clocks that need to be gated, then when all clocks have their negative-going edge aligned, all clocks are gated. Trace 409 represents the reset signal which is released from the reset gating module 101 at the appropriate point in time and showing reset assertion (on a negative going edge) while the clock is disabled and de-assertion (on a positive going edge) while the clock is disabled again.

Optionally, the reset circuitry can be arranged to run on a back-up clock source by the provision of switching circuitry which switches in the back-up clock if the SOC's clock is detected (by clock monitoring logic in the SOC) to have failed. As a further option, the reset circuitry is arranged, under conditions of total failure of the clock supply, to switch in a bypass link so that the output of the reset generator is directed straight to the SOC domains, thereby by-passing the reset gating module and clock gating module.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice-versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

The arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Furthermore for example, in one embodiment, the illustrated examples may be implemented as circuitry located on a single integrated circuit or within a same device. Further, the entire functionality of the modules shown in FIG. 1 may be implemented in an integrated circuit. Such an integrated circuit may be a package containing one or more dies. Alternatively, the examples may be implemented as any number of separate integrated circuits or separate devices interconnected with each other in a suitable manner. An integrated circuit device may comprise one or more dies in a single package with electronic components provided on the dies that form the modules and which are connectable to other components outside the package through suitable connections such as pins of the package and bond wires between the pins and the dies.

Also for example, the examples, or portions thereof, may implemented as soft or code representations of physical circuitry or of logical representations convertible into physical circuitry, such as in a hardware description language of any appropriate type.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. Reset circuitry for an integrated circuit, wherein the integrated circuit is provided with a clock and a reset generator, the reset circuitry comprising:
   a reset gating module for receiving a generated reset signal from the reset generator and for generating a clock gating instruction in response; and
   a clock gating module, operably coupled to the reset gating module, for receiving the clock gating instruction and in response, for gating the clock and generating a confirmation signal when the clock has been gated,
   wherein the reset gating module, upon receipt of the confirmation signal, releases the reset signal for propagation in the integrated circuit, and upon expiry of a first pre-set time period, instructs the clock gating module to re-instate the clock for at least a second pre-set time period.

2. The reset circuitry of claim 1, wherein the integrated circuit is partitioned into domains and wherein the reset gating module comprises a plurality of reset gating circuits, each for receiving a respective reset signal from the reset generator for assertion and de-assertion in a respective domain.

3. The reset circuitry of claim 1, wherein the first time period is no less than a maximum reset propagation delay of the integrated circuit.

4. The reset circuitry of claim 1, wherein the second pre-set time period is no less than a minimum duration for which a reset procedure for the integrated circuit has to remain in a particular phase.

5. The reset circuitry of claim 1, wherein the reset gating module compares a current operational status between itself and the reset generator and generates a control signal for application to the reset generator for synchronizing operation of the reset generator with itself.

6. The reset circuitry of claim 1, wherein the integrated circuit has a plurality of clocks and wherein the clock gating circuit is arranged to:
   detect a point in time when the clocks are in synchronism with one another; and
   after receiving the clock gating instruction from the reset gating module, to delay gating the clocks until the clocks are detected to be in synchronism with one another.

7. The reset circuitry of claim 1, further comprising a watchdog circuit for detecting a malfunction of the reset gating module or the clock gating module, and for generating one or more control signals for enabling a reset signal generated by the reset generator to be propagated within the integrated circuit.

8. The reset circuitry of claim 1, wherein said reset circuitry is arranged to switch on a back-up clock on failure of the integrated circuit clock.

9. The reset circuitry of claim 1, wherein said reset circuitry is arranged, upon failure of the integrated circuit clock, to switch in a bypass link so that a reset signal generated by the reset generator by-passes the reset gating module.

10. A method of resetting an integrated circuit, wherein the integrated circuit is provided with a clock and a reset generator, the method comprising:
    detecting a generated reset signal and generating a clock gating instruction in response;
    gating the clock and generating a confirmation signal when the clock has been gated;
    releasing the reset signal for propagation in the integrated circuit; and
    upon expiry of a first time period, re-instating the clock for at least a second time period.

11. An integrated circuit including reset circuitry, a reset generator and a clock, wherein the reset circuitry comprises:
    a reset gating module for receiving a generated reset signal from the reset generator and for generating a clock gating instruction in response; and
    a clock gating module, operably coupled to the reset gating module, for receiving the clock gating instruction and in response, for gating the clock and generating a confirmation signal when the clock has been gated,
    wherein the reset gating module is arranged, on receipt of the confirmation signal, to release the reset signal for propagation in the integrated circuit, and on expiry of a first pre-set time period, to instruct the clock gating module to re-instate the clock for at least a second pre-set time period.

* * * * *